United States Patent [19]

Serbent et al.

[11] 4,247,323

[45] Jan. 27, 1981

[54] PROCESS OF DIRECTLY REDUCING IRON OXIDE-CONTAINING MATERIALS

[75] Inventors: Harry Serbent, Hanau; Wolfram Schnabel, Hattersheim; Gerhard Reuter, Frankfurt am Main, all of Fed. Rep. of Germany

[73] Assignee: Metallgesellschaft Aktiengesellschaft, Frankfurt am Main, Fed. Rep. of Germany

[21] Appl. No.: 64,976

[22] Filed: Aug. 8, 1979

[30] Foreign Application Priority Data

Aug. 16, 1978 [DE] Fed. Rep. of Germany ....... 2835866

[51] Int. Cl.³ .......................................... C21B 13/08
[52] U.S. Cl. ..................................................... 75/36
[58] Field of Search ...................... 75/33–38; 266/173

[56] References Cited

U.S. PATENT DOCUMENTS 3,235,375   2/1966   Meyer et al. ............................ 75/36

*Primary Examiner*—M. J. Andrews
*Attorney, Agent, or Firm*—Sprung, Felfe, Horn, Lynch & Kramer

[57] ABSTRACT

When in the direct reduction of iron-oxide-containing materials in a rotary kiln solid, carbonaceous reducing agents having a high content of volatile constituents are charged to the rotary kiln at its charging end, a reoxidation of the sponge iron can readily occur in the final portion of the reduction zone unless a definite surplus of solid reducing agent is there maintained. To reduce the required surplus while still positively avoiding reoxidation, reducing gases and/or liquid hydrocarbons are introduced in said final portion by means of tubular air nozzles at least partially into the charge located above the air nozzles beginning with at least 75 percent metallization.

13 Claims, No Drawings

PROCESS OF DIRECTLY REDUCING IRON OXIDE-CONTAINING MATERIALS

BACKGROUND OF THE INVENTION

1. Field of the Invention

This invention relates to a process of directly reducing iron oxide-containing materials, preferably iron ores, to produce sponge iron in a rotary kiln below the softening and melting point of the charge, comprising charging solid carbonaceous reducing agents having a high content of volatile constituents into a rotary kiln at its charging end, feeding oxygen-containing gases through shell tubes at controlled rates into the free kiln space, and moving the charge and the gas atmosphere in the rotary kiln countercurrently to each other.

2. Discussion of the Prior Art

In the production of sponge iron in a rotary kiln by means of solid carbonaceous reducing agents there is a risk of a reoxidation of the sponge iron in the final portion of the reduction zone unless the charge in said final portion contains a surplus of solid reducing agent which maintains in the bed a reducing atmosphere with respect to sponge iron. For this reason the process is usually carried out with a relatively high surplus of carbon. The surplus reducing agents must be separated and should be recycled to the rotary kiln, for economical reasons. On the other hand, other components of the charge, particularly fine-grained components, often tend to deposit on the reducing agent during its travel through the kiln, owing to the large surface of the reducing agent, so that the melting point of the coal ash is often decreased below the reduction temperature and incrustations may form in the kiln. Because the surplus reducing agent or the recycled reducing agent has a low bulk density, it occupies a relatively large volume in the kiln, compared to the metallic component. As that occupied kiln volume cannot be used for the throughput of metallic component, it tends to decrease the residence time of the metallic component. Moreover, the recirculated reducing agent must be re-heated to the reduction temperature and must be cooled in the material discharged from the kiln. This results in a longer heating-up time, a larger heat consumption and a discharge of a larger quantity of material, which must be cooled.

It has already been proposed in West German Offenlegungschrift (DOS) No. 19 42 541 to use a reducing agent consisting of highly reactive coals, which disintegrate at the kiln temperature, to blow in said coals from the discharge end, to distribute them at least throughout the length of the reduction zone, and to control the operation of the rotary kiln at such a throughput rate that the desired degree of metallization is achieved and the material discharged from the kiln contains carbon at a rate which is less than 1.5 percent referred to the amount of iron oxide-containing charge material. The surplus cannot be decreased to consist only of carbon deposited on sponge iron but for safety reasons in case of fluctuations in the operation, the material discharged from the kiln must contain additional carbon at a rate of 0.1 to 0.7 percent of the rate at which iron oxide-containing material is charged to the kiln. In order to ensure these small surplusses, the reducing agent must be distributed over the reduction zone in relation to the removal of oxygen so that coal is available just in the required quantity in any given part of the charge. Particularly in large rotary kilns such exact distribution requires a considerable expenditure for the feeders and their control means. Besides, the coal must always be supplied in the same particle size distribution. There must be no short-time fluctuations in the operation of the kiln because they would require a larger safety surplus.

It is known from West German Pat. No. 10 32 550 that the reactions taking place in the charge during the reduction with solid reducing agents can be accelerated by a blowing of air or reducing gases through the charge which has been heated to the reduction temperature by a central burner. A decribed of the required carbon surplus is not described in that publication and is not accomplished in the proccess disclosed therein.

It is known from U.S. Pat. No. 3,180,725 to charge the solid carbonaceous reducing agent into the kiln at a point which is spaced from the charging end and to add a surplus, which may be separated from the material discharged from the kiln and may be recycled. Gaseous or liquid reducing agent may be blown into the charge in the reducing zone and may be used to produce solid carbon. The required surplus is not affected by that practice.

In accordance with West German Pat. No. 12 26 126, hydrocarbons and air are introduced into the charge bed to provide for a carbon surplus in the material discharged from the kiln.

West German Pat. No. 12 73 549 describes the production of low-sulfur sponge iron in which substances that contain or release hydrogen are blown into the charge in the reduction zone. This does not affect the required carbon surplus.

U.S. Pat. No. 2,663,632 describes a two-stage reduction process, in which a metallization of 50 to 80 percent is effected by means of solid reducing agents in the first stage and the further reduction is effected in a separate furnace by means of reducing gases, which cool the sponge iron at the same time. Two units and a complicated transfer mechanism are required in that process. If the gases from the second stage are used in the first stage, only coke can be used as a solid reducing agent.

It is known from German Offenlegungschrift No. 21 46 133 and from U.S. Pat. No. 3,182,980 to reduce pellets only by means of hydrocarbons or to process pellets in which coal powder or coal dust has been incorporated to provide part of the required fuel. The hydrocarbons are fed into the charge in the reduction zone through tubular air nozzles. This feeding begins at that point of the kiln at which the charge has approximately reached the reduction temperature. Oxidizing gases are blown through the tubular air nozzles into the free kiln space. That processes lack the advantages which are afforded by the addition of solid reducing agent to the charge. As a result of such addition, the reducing agent is uniformly distributed and acts uniformly throughout the length of the rotary kiln. In addition, the charge bed is less compact and the temperature threshold for the sintering is increased. Another disadvantage resulting from the blowing of air through tubular air nozzles resides in that flames are formed at the kiln wall.

It is known from German Offenlegungschrift No. 25 01 182 to charge the rotary kiln at its charging end with agglomerated, highly reactive, solid carbonaceous reducing agents, which contain 20 to 50 percent of volatile constituents, and to heat up said reducing agents at such a rate that they substantially disintergrate to a fine-grained material within the heating-up zone of the rotary kiln before the end of said zone. In that process, the rate at which carbon must be discharged from the kiln may be less than 1 percent of the rate at which iron oxide-containing material is fed, particularly when a reducing flame is maintained in the final portion of the reduction zone by a central burner which is operated with oil or gas and a deficiency of air.

It is an object of the invention to provide a process for the production of sponge iron by means of solid carbonaceous reducing agents in which the reoxidation of the sponge iron in the final portion of the reduction zone of the rotary kiln is reliably avoided with simple means whereas a surplus of solid carbon is minimized.

SUMMARY OF THE INVENTION

In accordance with the invention this object is accomplished by feeding a reducing gas with and/or liquid hydrocarbon through tubular air nozzles into the final portion of the reduction zone, said final portion beginning at a point where at least 75 percent of the iron has been metallized, at least part of said reducing gas and/or liquid hydrocarbon being fed into the charge which charge is disposed over a tubular air nozzle through which said reducing gas or liquid hydrocarbons possess. Part of the reducing gases and/or liquid hydrocarbons may be fed through the tubular air nozzles into the free kiln space in the final part of the reduction zone. This results in a cooling of the supply conduits. A small flow rate is sufficient for that purpose.

"Metallization" is the ratio of total iron to metallic iron in the charge. The term "tubular air nozzles" describes feeders which extend through the kiln wall and the refractory lining of the rotary kiln and have outlet openings disposed in the inside surface of the refractory lining or shortly inwardly or outwardly of said surface. The tubular air nozzles may consist of ceramic or metallic materials. The feeding of reducing gases and/or liquid hydrocarbons through tubular air nozzles into the charge begins at the point where a metallization of a least 75 percent has been achieved. Additional tubular air nozzles spaced about 1.5 to 3.5 meters apart are provided in the final portion of the reduction zone. With that spacing, sufficient reducing materials can generally be blown into the bed and the structure of the kiln is not weakened. At each blowing station, the radial tubular air nozzles may form an annular series in which they are spaced usually 1.5 to 3.5 meters apart also in the peripheral direction. The tubular air nozzles may be arranged on the kiln shell along a helix. If all reducing gases and/or liquid hydrocarbons are to be fed into the charge, control mechanisms will be provided, which ensure that reducing gases and/or liquid hydrocarbons are fed only to those tubular air nozzles which are disposed under the charge. In any case, there will be a tubular air nozzle closely spaced before the dischage end of the rotary kiln. Reducing gases are blown into the kiln and liquid hydrocarbons such as oil are injected under pressure or through nozzles.

The oxygen-containing gases required for the combustion generally consist of air and are fed into the free kiln space through radial shell tubes, which are spaced in the longitudinal direction of the rotary kiln and have outlet openings which are disposed at or near the center of the cross-section of the kiln. Because these outlet openings are parallel to the longitudinal axis of the kiln and not covered by the charge, only one shell tube is required at each blowing station. Part of the solid reducing agent which has been fed is still available in the final portion of the reduction zone and serves as a reducing agent therein. The solid carbonaceous reducing agent which is charged into the rotary kiln at its charging end contains at least 20 percent volatile constituents, based on dry matter. Such reducing agents include mainly brown coals and subbituminous coals. The rate at which reducing gas and/or liquid hydrocarbons are fed is controlled so that a layer of reducing gases is maintained on the surface of the charge in order to prevent a reoxidation of the sponge iron which has been formed. The expression "reducing gas" used for this purpose is understood with regard to metallic iron.

According to a preferred feature, the reducing gases and/or liquid hydrocarbons are fed into the reduction zone in a final portion thereof which begins where a metallization of at least 80 percent has been achieved. In that case a reoxidation can be prevented with a small expenditure.

According to a preferred feature, the quantity of solid carbonaceous reducing agent in the final portion of the reduction zone and the rate at which reducing gases and/or oil fed into said portion are controlled so that a reoxidation of sponge iron is prevented and the material discharged from the kiln is virtually free from free solid carbon when the desired final metallization has been achieved. "Free carbon" is carbon which is not desposited on the sponge iron. In that case it is not necessary to subject the material discharged from the kiln to a magnetic separation in order to remove surplus carbon and the feeding of solid carbonaceous reducing agent may be restricted to the quantity required for the reduction.

According to a preferred feature, the sponge iron is carburized to about 2 percent carbon in the final portion of the reduction zone by the reducing gases and/or liquid hydrocarbons which are fed. This carburization is accomplished by the provision of a sufficiently large quantity of available carbon in the reducing gases and/or liquid hydrocarbons which are fed. As a result, the carbon which is required for the further reduction of the sponge iron in the succeeding metallurgical processes carried out in a molten phase is available in an ideal distribution.

According to a preferred feature, oxygen-containing gases are blown at controlled rates through tubular air nozzles into the charge disposed over tubular air nozzles in the heating-up zone of the rotary kiln in that region of said zone which begins where the occurrence of ignitable particles of the solid reducing agent beings and which terminates before the reduction zone, and oxygen-containing gases are blown at controlled rates through shell tubes into the free kiln space at least in said region of the heating-up zone. The tubular air nozzles are arranged in the manner which has been described. Where this feature is adopted, the size of the heating-up zone of the rotary kiln is greatly decreased, the difference between the gas temperature and the bed temperature is minimized, the total energy consumption is greatly utilized because the heat content of the volatile combustible constituents of the reducing agent is greatly decreased, the gas temperature in the free kiln space and the exhaust gas temperature are decreased, and the direct gasification of carbon on the surface of the bed is decreased because no heat is retained there as might otherwise be the case. The first occurrence of ignitable particles of the reducing agent begins in the lower portion of the rolling surface of the charge. As the individual particles roll down on the surface of the rolling bed, the particles are heated up by the hot kiln gases and reach the ignition temperature for the first time shortly before entering the rolling bed at a certain distance from the charging end. The blowing of oxygen-containing gases through tubular air nozzles into the charge begins at that point. As a result, the ignitable reducing agent particles which have been ignited are not cooled below the ignition temperature but continue to burn when they have entered the rolling bed. The combustion now taking place within the charge results—like a chain reaction—in a release of additional volatile combustible constituents and soon spreads throughout the cross-section of the charge. The entire heat content of the volatile combustible constituents is now utilized to heat the charge and the heat exchange surface which is available for the heat transfer is substantially increased.

A preferred feature resides in that said region of the heating-up zone begins where the reducing agent has a temperature of about 300° C. and terminates where the charge has a temperature of 800° to 950° C. The lower temperature of the reducing agent is measured in the lower portion of the surface of the rolling bed formed by the charge, shortly before the particles enter the rolling bed, as has been described hereinbefore. The upper temperature is the average temperature of the entire rolling bed formed by the charge because a substantial equalization of temperature has taken place in the rolling bed before that temperature is reached. The selection of that temperature range ensures that the charge will not be cold-blown at temperatures below the lower temperature limit (3000° C.) and that the volatile constituents will be substantially expelled at the upper temperature limit (800° to 950° C.).

According to a preferred feature, 40 to 70 percent of all oxygen fed into the rotary kiln are blown into said region of the heating-up zone. This results in a particularly high heating-up rate.

According to a preferred feature, 10 to 60 percent of the oxygen blown into said region of the heating-up zone are blown throught the tubular air nozzles into the charge and the remainder is blown through the shell tubes into the free kiln space. This results in a fast heating and in a substantially complete combustion of the combustible gaseous constituents in the free kiln space.

According to a preferred feature, highly reactive, solid carbonaceous reducing agent briquettes, whch contain 20 to 50 percent volatile combustible constituents, are charged into the rotary kiln at the charging end thereof and are heated up at such rate that they disintergrate to a fine-grained material substantially within the heating-up zone of the rotary kiln and up to the end of said zone. As a result, such reducing agents can be used in an economical technically simple manner and their volatile constituents are optimally utilized in the rotary kiln, the dust losses in the exhaust gas are low and optimum operating conditions and a high throughput are accomplished. The burning of carbon is substantially decreased, particularly if the heating up in the heating-up zone is effected as described hereinbefore. The disintegration of the agglomerates in the heating-up zone of the rotary kiln and before the end of said zone is controlled in such a manner that there is a disintergration throughout the length of the heating-up zone and a complete disintegration of all agglomerates in the first portion of the heating-up zone is avoided. The reduction zone begins in the rotary kiln approximately at the point at which the charge has reached the reduction temperature and remains virtually constant. It will be understood that a reduction to form lower iron oxides will be effected even before the reduction zone thus defined. In the heating-up zone the reducing agent should disintegrate to a particle size which is favorable for the reduction, i.e., to a particle size which is as small as possible and less than 5 mm and in any case less than 8 mm. A small or further disintegration in the reduction zone is not disturbing.

Highly reactive coals are coals in which the carbon almost theoretically reacts with $CO_2$ at 1000° C. by the Boudouard reaction $CO_2+C\rightarrow 2$ CO. In practice the reactivity is determined in that $CO_2$ gas at 1000° C. is flown in contact with carbon which has been degasified at 1000° C. The rate at which carbon is consumed by the reaction with $CC_2$ to form CO is measured and stated in $$\frac{cm^3 CO}{grams\ C \times °C. \times sec}$$

The resulting rates are, for instance, below 1 for anthracite, between 1 and 2 for long-flaming gas coals, and above 3, preferably above 5, for the coals used in accordance with the invention. Such high reactivity permits of a virtually complete consumption of carbon for the reduction.

According to a preferred feature, most of the briquettes have a size of 1 to 7 cm. Very good operating conditions are obtained in that size range. Whereas all briquettes are produced in that range, part of them disintegrate in transit so that part of them has a particle size below 1 cm.

According to a preferred embodiment, the briquettes are heated up in the heating-up zone at 9° to to 15° C./min. At that heating-up rate, the charing of the reducing agent agglomerates is slower than the charging of the same reducing agent which is not agglomerated so that the charing is more uniformly distributed throughout the heat-up zone and the heat consumption is decreased. A heating up at that rate results in a particularly desirable disintegration of the agglomerated reducing agent and in lower losses by dust and combustion.

The advantages afforded by the invention reside in that no surplus of solid carbon in the material discharged from the kiln is required or a small surplus is sufficient and nevertheless a reoxidation of the sponge iron is reliably prevented although there is no surplus or only a small surplus of solid carbon in the material discharged from the kiln. The throughput rate of the rotary kiln is increased and the energy consumption is decreased. The material discharged from the furnace need not be subjected to a magnetic separation to remove surplus carbon. The material discharged from the kiln can be used at elevated temperatures in melting furnaces without difficulty because there is no unmagnetic fraction.

The reducing gases and/or liquid hydrocarbons are introduced into the final portion of the reduction zone through the tubular air nozzle at controlled rates such that a layer of reducing gases is maintained on the surface of the charge.

EXAMPLE 1

A rotary kiln which had an inside diameter of 0.80 m and a length of 12.00 m was charged with bituminous coal having 48% C fixed, 28% volatile mater and 24% ash together with ore pellets containing 67% Fe and a diameter from 6 to 15 mm.

(a) Conditions without gas addition:

| | |
|---|---|
| pellet-charging rate: | 400 kg/h |
| coal-charging rate (dry): | 250 kg/h |
| $C_{fixed}$/Fe ratio at the charging end: | 0.48 |
| $C_{fixed}$/Fe ratio at the discharge end: | 0.07 |
| Temperatures at the discharge end | |
| gas temperature: | 1180° C. |
| material temperature: | 1020° C. |
| Sponge iron pellets discharged | |
| metallization: | 86% |
| C-content: | 0.15% |
| grain size above 15 mm: | 10% |
| Sponge iron pellets sampled 1.65 m before discharge end | |
| metallization: | 75% |
| C-content- | 0.13% |

(b) Conditions with gas addition

15 Nm³/h of natural gas were fed into the final part of the reduction zone beginning with 75% metallization. 60% of the gas were fed by means of tubular air nozzles into the charge and 40% were fed into the free kiln space.

| | |
|---|---|
| Temperature at the discharge end | |
| gas temperature: | 1140° C. |
| material temperature: | 980° C. |
| Sponge iron pellets discharged | |
| metallization: | 94% |
| C-content: | 0.6% |
| grain size above 15 mm: | below 2% |
| $C_{fixed}$/Fe ratio at the discharge end: | 0.11 |

(c) Pellet-charging rate 450 kg/h with the same gas addition

| | |
|---|---|
| $C_{fixed}$/Fe ratio at the charging end: | 0.40 |

The temperatures of the gas and the material were held constant by increasing the amount of air.

| | |
|---|---|
| Sponge iron pellets discharged | |
| metallization: | 91% |
| C-content: | 0.3% |

$C_{fixed}$/Fe ratio at the discharge end:
0.04, without increase of agglomeration.

EXAMPLE 2

The same kiln and the same ore were used, but a brown coal having 44% $C_{fixed}$, 51% volatile mater and 5% ash were charged.

(a) Conditions without gas addition

| | |
|---|---|
| Pellet-charging rate: | 600 kg/h |
| coal-charging rate (dry) | 385 kg/h |
| $C_{fixed}$/Fe ratio at the charging end: | 0,42 |
| $C_{fixed}$/Fe ratio at the discharge end: | 0.01 |
| Temperatures at the discharged end | |
| gas temperature: | C. |
| material temperature: | 940° C. |
| uz,4/18 Sponge iron pellets discharged | |
| metallization: | 91% |

| | |
|---|---|
| C-content: | 0.11% |
| grain size above 15 mm: | 5% |
| Sponge iron pellets sampled 1.65 m before discharge end | |
| metallization: | 93% |
| C-content: | 0,15% |

(b) Conditions with gas addition
The gas addition was the same than in Example 1.

| | |
|---|---|
| Temperatures at discharge end | |
| gas temperature: | 1090° C. |
| material temperature: | 925° C. |
| Sponge iron pellets discharged | |
| metallization: | 99% |
| C-content | 0.93% |
| Sponge iron pellets sampled 1,65 m before discharge end | |
| metallization: | 97% |
| C-content: | |
| $C_{fixed}$/Fe ratio at the discharge end | |
| | 0.02 |

(c) Increase of pellet charging rate with the same gas addition

The charging rate was increased step by step by 25 kg. For the first time at a rate of 700 kg/h there was observed a reoxidation of the sponge iron and an agglomeration. The $C_{fixed}$/Fe ratio at the discharge end decreased to zero and the C-content of the sponge iron was about 0.08%.

What is claimed is:

1. In a process of directly reducing iron oxide-containing materials, preferably iron ores, to produce sponge iron in a rotary kiln below the softening and melting point of the charge by charging solid carbonaceous reducing agents having a high content of volatile constituents into a rotary kiln at its charging end, feeding oxygen-containing gases through shell tubes at controlled rates into the free kiln space, and moving the charge and the gas atmosphere in the rotary kiln countercurrently to each other, the improvement which comprises feeding a reducing gas and/or liquid hydrocarbon through at least one tubular air nozzle into the final portion of the reduction zone, said final portion beginning at a point where at least 75 percent of the iron has been metallized, at least part of said reducing gas and/or liquid hydrocarbon being fed into the charge disposed over said tubular air nozzle.

2. A process according to claim 1 wherein the reducing gas and/or liquid hydrocarbons is fed into the reduction zone in a final portion thereof which begins where a metallization of at least 80 percent has been achieved.

3. A process according to claim 1 wherein the quantity of solid carbonaceous reducing agent in the final portion of the reduction zone and the rate at which reducing gas and/or oil fed into said portion are controlled so that a reoxidation of sponge iron is prevented and the material discharged from the kiln is virtually free from free solid carbon when the desired final metallization has been achieved.

4. A process according to claim 1 wherein the sponge iron is carburized to about 2 percent carbon in the final portion of the reduction zone by the reducing gas and/or liquid hydrocarbon which is fed.

5. A process according to claim 1 wherein oxygen-containing gases are blown at controlled rates through tubular air nozzles into the charge disposed over tubular air nozzles in the heating-up zone of the rotary kiln in that region of said zone which begins where the occurrence of ignitable particles of the solid reducing agent occur and which terminates before the reduction zone, and oxygen-containing gases being blown at controlled rates through shell tubes into the free kiln space at least in said region of the heating-up zone.

6. A process according to claim 5 wherein said region of the heating-up zone begins where the reducing agent has a temperature of about 300° C. and terminates where the charge has a temperature in the range of 800° to 950° C.

7. A process according to claim 5 wherein 40 to 70 percent of all oxygen fed into the rotary kiln is blown into said region of the heating-up zone.

8. A process according to claim 5 wherein 10 to 60 percent of the oxygen blown into said region of the heating-up zone is blown through at least one tubular air nozzle into the charge and the remainder is blown through shell tubes into the free kiln space.

9. A process according to claim 1 wherein highly reactive, solid carbonaceous reducing agent briquettes, which contain 20 to 50 percent volatile combustible constituents, are charged into the rotary kiln at the charging end thereof and are heated up at such a rate that they disintegrate to a fine-grained material substantially within the heating-up zone of the rotary kiln and up to the end of said zone.

10. A process according to claim 9 wherein most of the briquettes have a size of 1 to 7 cm.

11. A process according to claim 9 wherein the briquettes are heated up in the heating-up zone at a rate of 9° to 15° C./min.

12. A process according to claim 1, wherein said reducing gas and/or liquid hydrocarbon is introduced only into the final portion of the reduction zone.

13. A process according to claim 12, wherein only solid carbonaceous reducing agent is fed together with the iron oxide-containing material into the rotary kiln.

* * * * *